Patented Apr. 6, 1926.

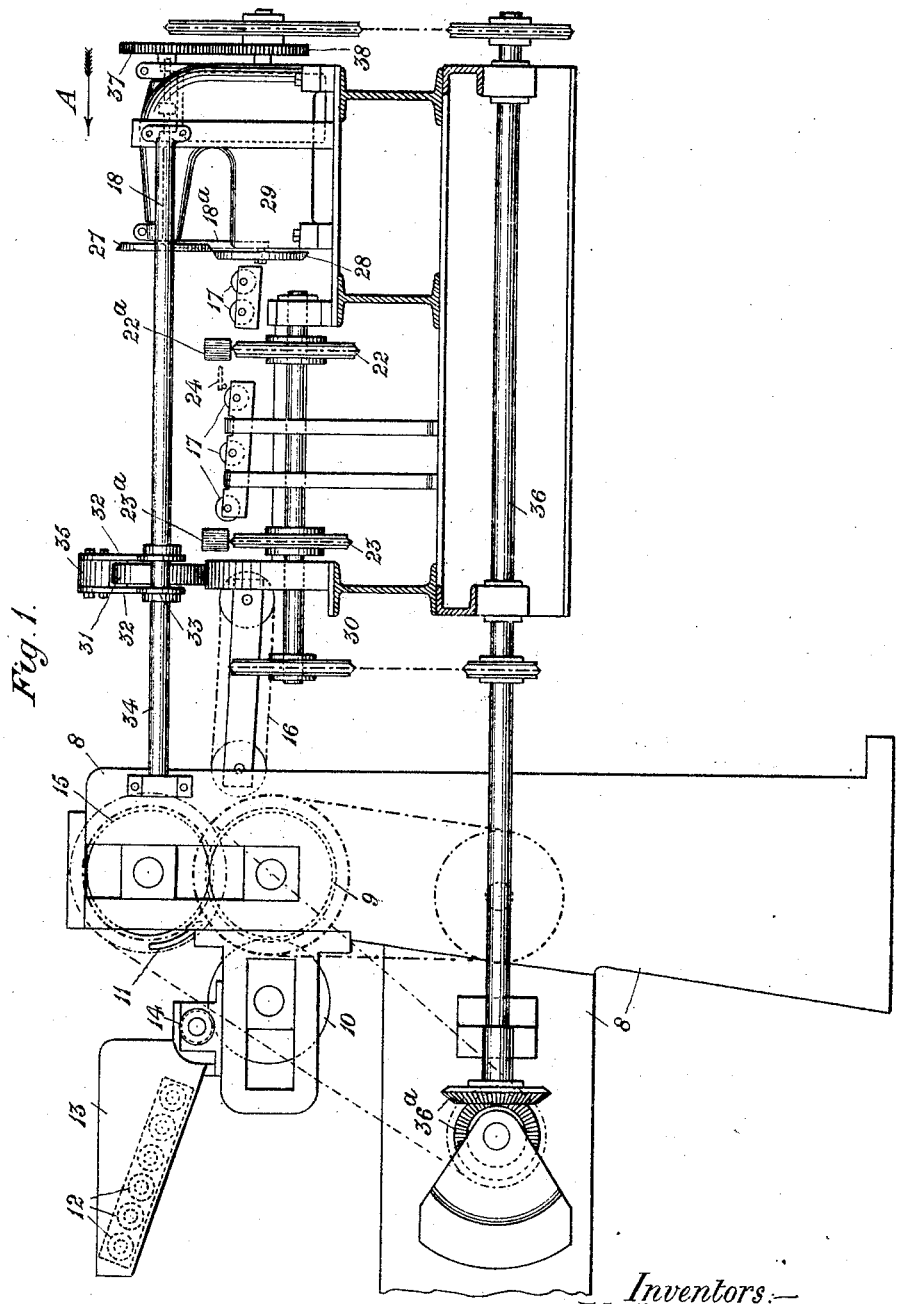

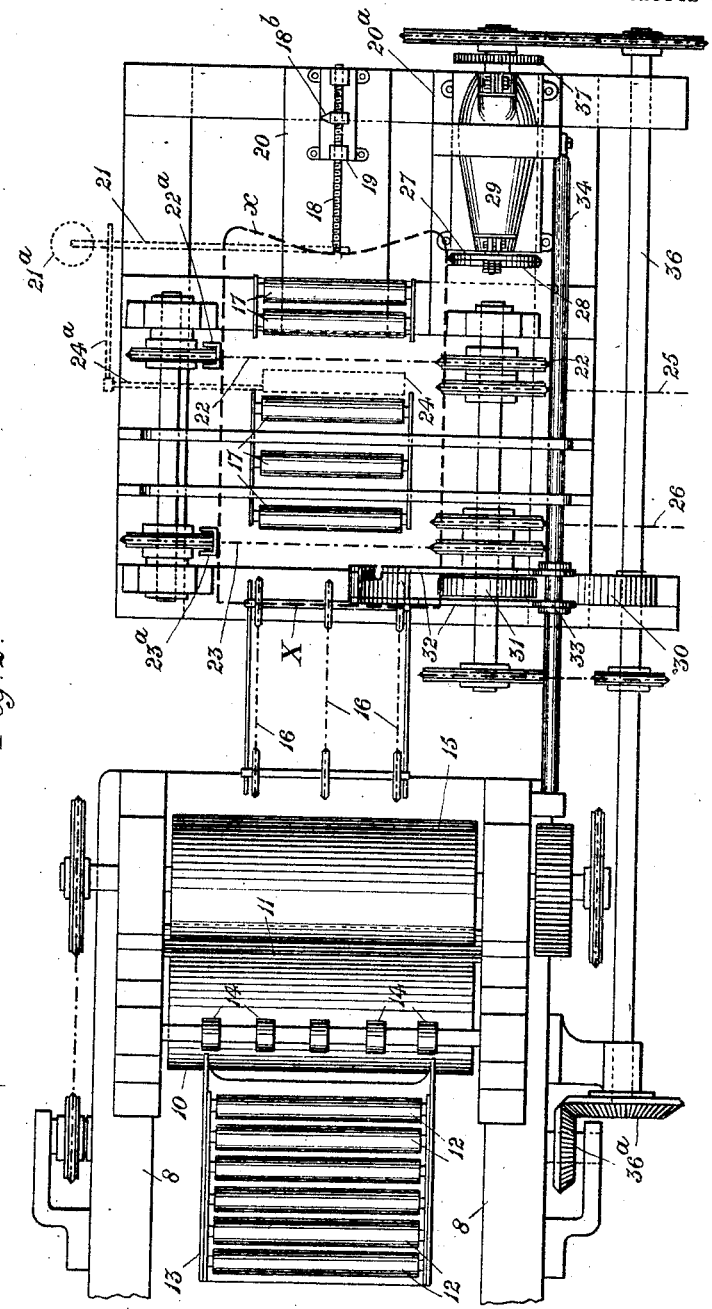

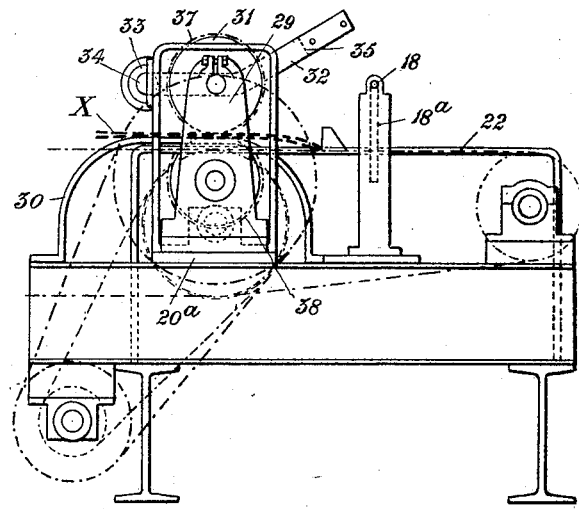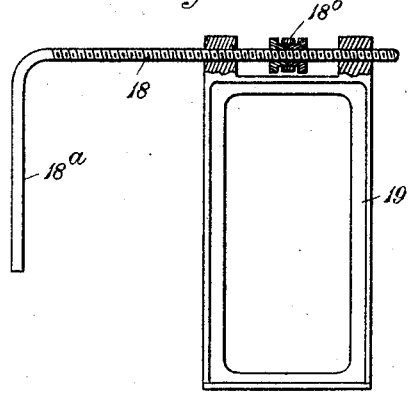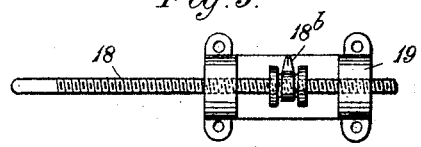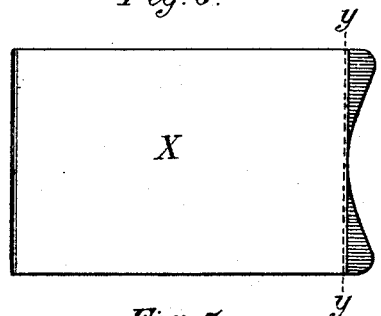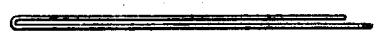

1,579,971

UNITED STATES PATENT OFFICE.

HUBERT SPENCE THOMAS, OF LLANDAFF, AND WILLIAM ROBERT DAVIES, OF WHITCHURCH, GREAT BRITAIN.

APPARATUS FOR MANUFACTURING TIN AND OTHER PLATES OR SHEETS.

Application filed June 23, 1924. Serial No. 721,846.

*To all whom it may concern:*

Be it known that HUBERT SPENCE THOMAS and WILLIAM ROBERT DAVIES, subjects of the King of Great Britain, respectively residing at "Hazelwood," Cardiff Road, Llandaff, in the county of Glamorgan, Great Britain, and "Forest-Lyn," Church Road, Whitchurch, in the county of Glamorgan, Great Britain, have invented certain new and useful Improvements in Apparatus for Manufacturing Tin and Other Plates or Sheets, of which the following is a specification.

Our invention relates to the manufacture of tin-plates and other like metal plates or sheets and more particularly to the bending or folding and trimming processes incidental to the production from the piece or bar of metal of the sheets technically termed in the tin-plate industry "black plates".

We will describe the invention with reference to the production of "black plates" but wish it to be understood that it may be applied generally where a series of plates or sheets are to be produced in the manner hereinafter referred to from pieces or bars of metal.

In order that the invention may be the better understood we remark that according to the ordinary process of producing "black plates" the piece, or bar, of steel after being heated and rolled to an approximately predetermined length is doubled over on itself and folded at the middle or thereabouts thus forming a two ply sheet which is returned to the furnace and reheated. Another rolling, another doubling and then another heating are usually effected and the said processes are repeated until the number of layers or plies in the pack reaches the number desired for the particular class of plate or sheet to be produced. No hard and fast rule as to the number of doubling operations exists and when the pack contains the required or desired number of plies or layers, usually in the tin-plate industry eight sheets, it is trimmed and the plies are pulled apart each ply affording a single black plate or sheet.

In certain stages of the doubling operations referred to it will be understood that the pack of sheets has at one end both folded and unfolded edges, that is to say, some of the sheets are connected by the previous folding while others are not so connected at the said end and it is necessary to trim this end of the pack to disconnect all the sheets at the said end before the next rolling operation.

The preliminary and successive doubling operations on the rolled sheets and also the trimming operations referred to is work of a laborious nature being commonly effected mainly by the manipulative skill of the workman aided by mechanical means such as a stamp and shear blade or guillotine for the respective operations or the doubling operations may be carried into effect, by the machine described, represented and claimed in the specification of our Patent No. 1,535,876, dated April 28, 1925.

The present invention consists in combining with sheet doubling machinery means or mechanism whereby the trimming operations referred to are effected without the intervention of hand labour between the doubling and trimming processes and we will describe the invention as applied to the doubling machine of our prior patent referred to although we wish it to be understood that it may be combined with other doubling machinery where the manner of delivery of the doubled sheets from the machine renders its application practicable.

In a convenient arrangement of mechanism for carrying our invention into effect we provide above the rolls which deliver the folded sheets from the doubling machine a guide roller or rollers or other guiding means for deflecting the double sheet on to an inclined table or platform preferably constituted by a series of rollers the sheet being so deflected that the edges which have been brought together by the doubling operation and which edges are the edges requiring to be trimmed are in a forward direction relative to the motion of the sheet as it travels from the said platform. The sheet passes from the platform on to a conveyor arranged adjacent the lower end of the said platform and the said conveyor conveniently comprises a series of freely rotating rollers or two or other number of travelling endless chains driven by sprocket or other gear wheels. From this conveyor the sheets pass on to a second platform constituted preferably by a series of rollers the plane containing the axes of the several rollers being slightly inclined so that the sheet delivered thereon is carried forward until arrested by a stop. The said stop is capable of adjustment to and from the edge of the platform to which it is adjacent and by the adjustment of the stop to any predetermined position the extent to which the edges of the sheets are cut off or trimmed is regulated.

The edges of the sheet which come against the stop have a more or less irregular concave formation, forwardly projecting ear pieces being produced at the corners thereof by the rolling operations and in order to permit the doubled sheet to perform its next motion which is in a direction at right angles to its previous motion the stop which acts against the innermost part of the concave edges is made capable of temporary removal or deflection from the plane of the sheet.

Arranged on each side of the platform on to which the sheet is thus delivered and brought temporarily to rest by the stop is a continuous chain or like travelling conveyor provided with fingers or catches adapted by the continuous motion of the conveyor to be brought into contact with one side or edge of the folded sheet and transfer it in a direction at right angles to its previous motion on to a supporting table or platform or a further travelling chain or like conveyor.

Adjacent the side of the supporting table, platform or conveyor which the edges of the sheet to be trimmed overhang we provide a pair of rotary disc cutters or other cutting or shearing device so positioned that the part to be cut off or trimmed from the sheet is removed thereby as the sheet is carried along by the travelling fingers or catches.

Means such as rollers or pivoted pressure plates are preferably provided adjacent the table, platform or conveyor on which the sheet is travelling during the cutting operation to retain or hold the parts of the folded sheet in contact with each other and the lowermost sheet in contact with the table or the like said pressure means being such as will not arrest the forward or travelling motion of the folded sheet.

The invention will be further described with reference to the accompanying drawings, Figure 1 of which illustrates a convenient arrangement of mechanism or parts for carrying the invention into effect in its application to the sheet doubling machine of the aforementioned pending application so much only of that end of the said machine from which the doubled plates are delivered being shown in the said Figure 1 as is necessary to the understanding of the present invention.

Figure 2 is a plan of the same.

Figure 3 is an end view looking in the direction of the arrow A in Figure 1 the parts of the doubling machine being omitted.

Figures 4 and 5 represent in side elevation, partly in section and plan respectively a portion of the mechanism hereinafter particularly referred to detached.

Figure 6 represents in plan and Figure 7 in edge view, a plate or sheet after the first doubling operation the dotted line y y indicating approximately the line on which the cut will be made in the shearing machine for effecting the trimming of the folded sheet.

The chain gearing and conveyors are for the sake of simplicity and clearness indicated by dot and dash lines only in the drawings and a folded plate or sheet is indicated in heavy dotted lines, marked X in plan in Figure 2 and edge view in Figure 3, in two positions which it occupies while travelling through the machine.

The same numerals of reference indicate the same parts in the several figures of the drawings.

The portions of the standard or framing at the delivery end of the doubling machine are marked 8 and the rollers which lift the doubled or folded plate to deliver it from the machine are marked 9 and 10. Arranged above the said rolls 9 and 10 is a deflector 11 which causes the folded or doubled plate lifted by the said rolls to fall over on to an inclined receiving platform preferably constituted by a series of rollers 12, which may conveniently be mounted in the sheet metal trough-like member 13 so as to rotate freely on their spindles, the upwardly turned sides or wings of the said sheet metal member serving to preserve the plate or sheet from lateral displacement on the platform.

The folded plate or sheet is so deflected that the edges brought together by the doubling operation, which are the edges on which the cutting or trimming operation is to be effected are in a forward direction relative to the motion of the sheet as it slides from the roller platform 12 over the guide rolls 14 and into the nip between the roller 9 and a roller 15 arranged above the same, the said rollers 9 and 15 by their pressure on the sheet serving to effect a very efficient completion of the doubling or folding operation.

The folded or doubled sheet passes from between the rollers 9 and 15 on to a platform constituted by a pair or other number of travelling endless chains 16 driven by a sprocket or other gear which convey the plate on to a second platform constituted by a series of rollers 17 capable of freely rotating on their spindles. Or instead of the travelling endless chains 16 a series of rollers similar to the rollers 17 may be substituted therefor.

The plane containing the axes of the rollers 17, and when rollers are substituted for the travelling chain conveyors, the axes of the said substituted rollers also is slightly inclined so that the sheet delivered thereon travels forward until its front edge is arrested by the stop hereinbefore referred to, a plate being indicated in this position by the heavy dotted line X in Figure 2.

Since the irregular concave formation which the edge of the sheet to be trimmed has varies with each rolling operation to which it is submitted between the doubling operations and according to the heat at which the sheets are rolled the arresting stop is made capable of adjustment in a longitudinal direction and further as the next motion of the sheet is in a direction at right angles to its previous motion the stop must also be capable of removal or deflection from the path which is to be travelled by the said irregular concave edge otherwise the action of the stop on the irregular edge formed by the ear piece $x$, Figure 2, would deflect the sheet from the path which it is required to travel.

A convenient construction of adjustable and deflectable stop is shown in the drawings and is represented detached and drawn to a larger scale than in Figures 1, 2 and 3, in Figures 4 and 5, the said stop comprising a screwed rod 18 having a cranked depending portion $18^a$ against which depending part the edge of the sheet bears. The said screw rod is mounted so as to be capable of readily turning in screw boxes carried by the upper ends of the standard or support 19 secured to the girder supported foundation plate 20, so that when the sheet makes its motion in the direction of the shearing tools the depending portion $18^a$ is deflected without disturbing the sheet from the path in which it is travelling.

A gauge or setting device $18^b$ is mounted on the screwed portion 18 of the stop device.

Or instead of the stop mechanism described we may provide a stop mounted on a lever-like arm 21 with balance weight $21^a$ (indicated in dotted lines in Figure 2) the said arm being adapted to be automatically operated to remove the stop from the path of the sheet at the requisite time by the action thereon of an arm or tripper (not indicated) carried by the travelling conveyor chain 22 which with the conveyor chain 23 is provided adjacent the roller platform 17.

As the roller platform on which the sheet X rests against the stop is slightly inclined downwardly means may be provided to bring the sheet substantially horizontal for engagement by the fingers or catches hereinafter more particularly referred to on the conveyors 22 and 23 and for this purpose the platform may have therein a pivoted or hinged flap (or flaps) indicated in dotted lines at 24 in Figures 1 and 2 the said flap being automatically raised to the required extent to properly position the sheet as the catches engage the same the slight turning operation being conveniently effected by a cranked rod $24^a$ acted on by an arm of the lever 21 which supports the stop where a lever supported stop is provided.

The said conveyor chains 22 and 23 are provided with the fingers or catches $22^a$ and $23^a$ respectively which engage the edge of the sheet which is rearward relative to the direction which the sheet is now to travel, the sheet being moved thereby on to and carried along a fixed platform or table or, as shown in the drawing, on to the travelling chain conveyors 25 and 26 adjacent to which is arranged the shearing device preferably comprising the pair of rotary disc cutters 27, 28 the spindles of which are mounted in bearings in the standard or housing 29 bolted or otherwise secured on the girder supported platform $20^a$ or other convenient support.

The plate or sheet has been so positioned by the stop hereinbefore referred to that in its travelling motion relative to the shearing mechanism only so much is cut off the edges operated on as is requisite for the proper trimming thereof and a minimum amount of scrap metal results.

The edge of the plate or sheet which is remote from the cutter discs may where chain or equivalent conveyors 25, 26 are provided in lieu of a fixed platform or table be supported on the bridge-like member 30 while the plate is under the action of the cutters a weighted pressure roller 31 being provided to depress the plate or sheet into contact with the bridge-like supporting member, the said roller being conveniently carried by the arms 32 pivoted at 33 on the shaft 34 the unpivoted ends of the arms having a block 35 of any desired weight secured between them.

When a table or platform is provided similar weighted rollers may be combined therewith.

The conveyors 25 and 26 or supplementary conveyors co-acting therewith transfer the sheared plate or sheet back to the furnace to be heated for the succeeding doubling operation or to other desired place in the mill.

The edge view of the conveyors 25 and 26 is omitted from Figure 1 for the sake of clearness.

The conveyors described and the spindles of the shearing discs are synchronously driven preferably through sprocket wheel gearing from the main shaft 36 driven by the bevel wheels $36^a$ the spindles of the cutter discs being interconnected by the spur wheels 37 and 38, but it is unnecessary to enter into a fuller description of the gearing which will be clearly appreciated from an examination of the drawings and it may be varied within considerable limits without departing from the invention.

Claims:—

1. Mechanism for the manufacture of tin plates and sheets and other like plates and sheets, comprising in combination folding rolls, a conveyer having the delivery end thereof disposed adjacent the said rolls, the conveyer operating to continue the motion of the doubled sheet in a forward direction as received from said rolls, rotary cutting means, an adjustable and deflectable stop for arresting the doubled sheet in positive relation to said cutting means for determining the amount of scrap to be removed, and a second conveyer adapted to convey the sheet in a direction at right angles to its former direction of travel to cause the sheet to be engaged by the rotary cutters for effecting the removal of the predetermined amount of scrap during the travel of the doubled sheet on the said second conveyer.

2. Mechanism for the manufacture of tin plates and sheets and other like plates and sheets, comprising in combination folding rolls, a conveyer having the delivery end thereof disposed adjacent the folding rolls and operating to continue the motion of the doubled sheet in a forward direction as received from the rolls, an auxiliary conveying means cooperating with said conveyer to continue the forward direction of motion imparted to the sheet, a pair of superposed rotary cutting disks, an adjustable and deflectable stop operating to arrest the motion of the doubled sheet and determining the amount of scrap to be removed therefrom, a second conveyer operating to move the sheet in a direction at right angles to its former direction of travel and thereby cause the sheet to be engaged by the rotary cutting disks for effecting removal of the predetermined amount of scrap during travel of the doubled sheet on the said second conveyer, and means for synchronizing and controlling the operation of the said conveyers.

3. Mechanism for the manufacture of tin plates and sheets and other like plates and sheets, comprising in combination folding rolls, a chain conveyer having its delivery end adjacent the folding rolls and operating to continue the motion of the doubled sheet in a forward direction, a plurality of rotatable rollers to receive the sheet from the said conveyer, the plane tangential to the peripheries of the upper sections of the rollers being inclined downwardly, a pair of superposed rotary cutters, an adjustable and deflectable stop to arrest the motion of the sheet as received from said rollers and to position the sheet relative to the cutters for determining the amount of scrap to be removed, a second chain conveyer operating to move the sheet in a direction at right angles to its former direction of travel and thereby causing the sheet to be engaged by the rotary cutters for effecting the removal of the predetermined amount of scrap during the travel of the doubled sheet on the said second conveyer, and means for synchronizing and controlling the operation of the said conveyers.

In testimony whereof we have hereunto set our hands.

HUBERT SPENCE THOMAS.
WILLIAM ROBERT DAVIES.